US005794376A

United States Patent [19]
Frizzell et al.

[11] Patent Number: 5,794,376
[45] Date of Patent: Aug. 18, 1998

[54] APPARATUS FOR THREADING A WORM ONTO A MULTI-PRONG FISH HOOK

[76] Inventors: Dean L. Frizzell, 4721 65th St., Sacramento, Calif. 95820; Robert John Silva, 8530 Danridge Dr., Sacto, Calif. 95828

[21] Appl. No.: 893,335

[22] Filed: Jul. 16, 1997

[51] Int. Cl.[6] .................................................. A01K 91/00
[52] U.S. Cl. ........................... 43/43.15; 43/44.9; 43/43.1
[58] Field of Search ........................... 43/43.1, 43.15, 43/43.16, 44.82, 44.83, 44.9, 44.91, 4, 42, 42.24, 42.28, 42.36, 42.53, 43.4, 42.49

[56] References Cited

U.S. PATENT DOCUMENTS

| | | |
|---|---|---|
| 396,246 | 1/1889 | Vom Hope . |
| 1,561,512 | 11/1925 | Fredricks ........................... 43/42.36 |
| 3,392,476 | 7/1968 | Zielaskowski . |
| 4,532,731 | 8/1985 | Wheeler ............................ 43/43.13 |
| 4,823,495 | 4/1989 | Camilleri .......................... 43/43.13 |

*Primary Examiner*—Jack W. Lavinder
*Attorney, Agent, or Firm*—Robert W. Jenny

[57] ABSTRACT

The worm is threaded onto the hook before the leader is attached to the fish line. A tube and slider are threaded onto the leader before the loop is made on the leader and after the hook is attached to the leader. The tube has a small diameter, such as 1/16 inch, and is a few inches long, such as 5 inches. The slider is about 1/16 wide, 1/32 inch thick and 3/8 inches long with 3 holes normal to its wide faces distributed along its length. The leader is passed through the holes in series. A few ounces of force are required to move the slider along the leader. The end of the tube nearest the loop is at an angle to the long axis of the tube. To thread a worm onto the hook the leader is folded at the angled end of the tube back along the tube and the tube and leader are inserted into a worm a short distance from one end and through the longitudinal center of the worm and out its other end. The worm is moved along the leader until the loop end of the leader and the tube are clear of the worm and the worm is moved over the slider and onto the shank of the hook. The slider is then moved toward the loop end of the leader to hold the tube close to the loop while the leader and hook are in use.

1 Claim, 1 Drawing Sheet

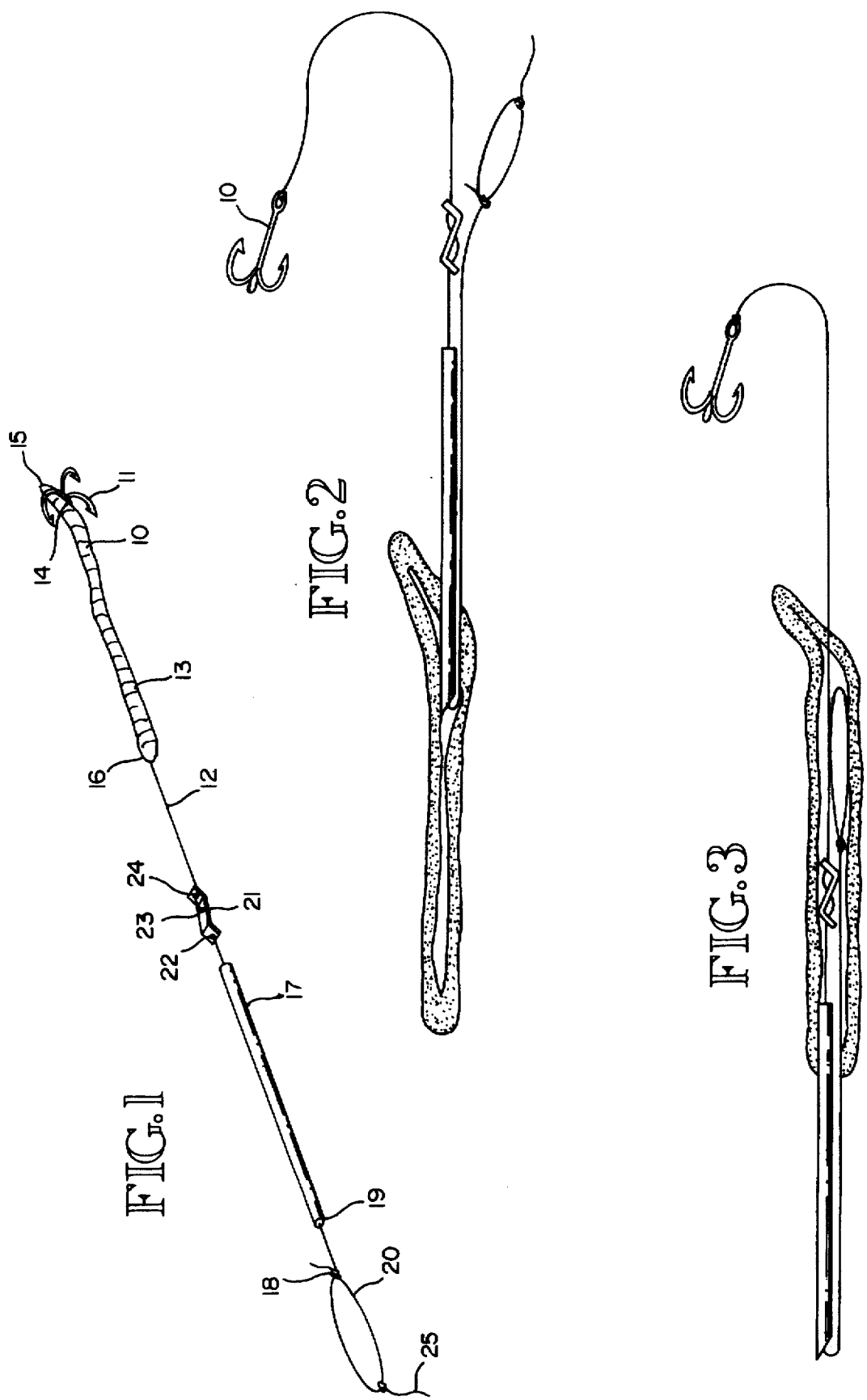

APPARATUS FOR THREADING A WORM ONTO A MULTI-PRONG FISH HOOK

BACKGROUND OF THE INVENTION

1. Field

The subject invention is in the general field of fishing apparatus, particularly apparatus involving lures and hooks. More particularly it is in the field of such particular apparatus in which a worm is the lure and is installed onto a fish hook in a preferred way, such installation being termed threading.

2. Prior Art

There is no known patented prior art in this more particular field and known to the inventor of the subject invention. When a worm is threaded onto a fish hook in the preferred way the shank of the hook and the line to which it is attached extend through the worm lengthwise from the end of the worm farthest from the hook to a point on the worm a short distance from its other end so that that end extends beyond the shank and past the prong(s) of the hook, a prong being a curved portion of a hook, often being barbed at its end. Conventional techniques for threading a worm onto a hook in this preferred way can be used only on hooks with one prong. A small diameter rod or tube is inserted into a worm a short distance from one of its ends and pushed through the lengthwise center and out its other end. The end of the rod is then aligned with the barbed (or not) end of the prong of the hook and the worm is slid along the rod or tube and onto the hook and leader to which the hook is attached until the insertion point is at the juncture of the prong and shank of the hook. However, it is well known in the art that multi-prong fish hooks are often more effective than single prong hooks.

Accordingly, the primary objective of the subject invention is to provide apparatus which enables threading a worm onto a multi-prong fish hook in the preferred way with minimum requirements for manual dexterity and minimum chances for loss or misplacement of the apparatus between times of use. Further objectives are that the apparatus be inexpensive and durable and not detract from the fishing effectiveness of the hook and worm.

SUMMARY OF THE INVENTION

The subject invention is apparatus for threading a worm onto a multi-prong fish hook in a preferred way. The worm is threaded onto the hook with a length of line termed a leader attached to the hook and with the leader not attached to a fish line. The apparatus is installed on the leader and comprises a piece of 1/16 inch outside diameter tube about 4 to 5 inches long and a component termed a slider. There is a loop at the end of the leader which is not attached to the hook. The slider is installed between the tube and the hook and is configured such that it can be slid along the leader but doing so requires a few ounces of force. The slider serves to keep the tube near the loop of the leader when desired but to allow the tube to be moved nearer the hook when a worm is being threaded onto the hook. The end of the tube nearest to the loop is cut at an angle in a range of 40° to 70° to the centerline of the tube.

In use, the slider and tube are moved close enough to the hook to allow the loop end of the leader to be folded at the angled end of the tube and held alongside of the tube with the loop beyond the other end of the tube toward the hook. The tube, with leader alongside, is then inserted into the worm a short distance from one end of the worm and pushed through the longitudinal center of the worm and out the end of the worm farthest from the insertion point. The tube and loop end of the leader are moved through the worm which can then be slid down the leader over the slider and onto the shank of the hook with the portion of the worm beyond the insertion point extending beyond the shank and between the prongs of the hook. The tube is then slid along the leader to near the loop and the slider is moved on the leader to hold the tube near the loop. The tube and slider remain on the leader ready for threading of another worm onto the hook. The slider improves the utility of the invention by keeping the tube away from the hook but it is not essential to the threading of a worm onto a multi-prong hook.

The invention is described in more detail below with reference to the attached drawings.

BRIEF DESCRIPTION OF THE DRAWINGS

FIG. 1 is a general view of a worm threaded onto a multi-prong fish hook with the subject apparatus installed on the leader to which the hook is attached.

FIG. 2 is a semi-schematic section showing the subject apparatus with a worm in the initial stage of threading a worm onto the hook.

FIG. 3 is a semi-schematic section showing the subject apparatus and a worm with the tube and leader extending through the worm.

DETAILED DESCRIPTION OF THE INVENTION

The subject invention is apparatus for threading a worm onto a multi-prong fish hook. In FIG. 1, a general view of a worm threaded onto such a hook, shank 10 (not visible) of hook 11 and leader 12 extend longitudinally through worm 13 from insertion point 14 near end 15 of the worm through end 16. The leader extends through tube 17 and loop knot 18 retains the tube on the leader. End 19 of the tube, nearest the leader loop 20, is at an angle to the long axis of the tube in a range of 40° to 70°. Slider 21 is also installed on the leader between the tube and the hook. The leader is threaded through holes 22, 23 and 24 in the slider in series. Installed this way the slider can be moved along the leader but it requires a force in a range of 1 to 10 ounces to move it. The worm is threaded onto the hook before the leader is attached to line 25.

FIG. 2 is a semi-schematic section showing the subject apparatus in the initial stage of threading a worm onto the hook. The leader is folded back along the tube at the angled end of the tube. The tube and leader are inserted into the worm at the insertion point 26 and moved through the longitudinal center of the worm.

FIG. 3 is a semi-schematic section showing the subject apparatus and a worm with the tube and loop extending through the worm. To complete the threading of the worm, as shown in FIG. 1, the worm is moved along the leader over the slider and onto the hook until the insertion point is at the juncture of the shank and prongs of the hook and then the slider is moved along the leader toward the loop to retain the tube near the loop while the leader and hook are in use.

It is considered to be understandable from this description that the subject invention meets its objectives. It provides apparatus which enables threading a worm onto a multi-prong fish hook in the preferred way. Minimal manual dexterity is required and there are minimum chances for the apparatus to be lost or misplaced between times of use.

It is also considered to be understood that while one embodiment of the invention is described herein other embodiments and modifications of the one described are possible within the scope of the invention which is limited only by the attached claims.

I claim:

1. Apparatus for threading a worm onto a multi-prong fish hook, said apparatus comprising:

a leader, a tube and a slider, said leader having a first end and a second end, with a loop formed at said first end and said second end being attached to said fish hook, said tube and said slider being installed on said leader with said slider between said tube and said fish hook, and said slider being configured such that force in a range of 1 to 10 ounces is required to move said slider on said leader.

* * * * *